J. N. POND.
Plow-Fender.
No. 59,515.
Patented Nov. 6, 1866.
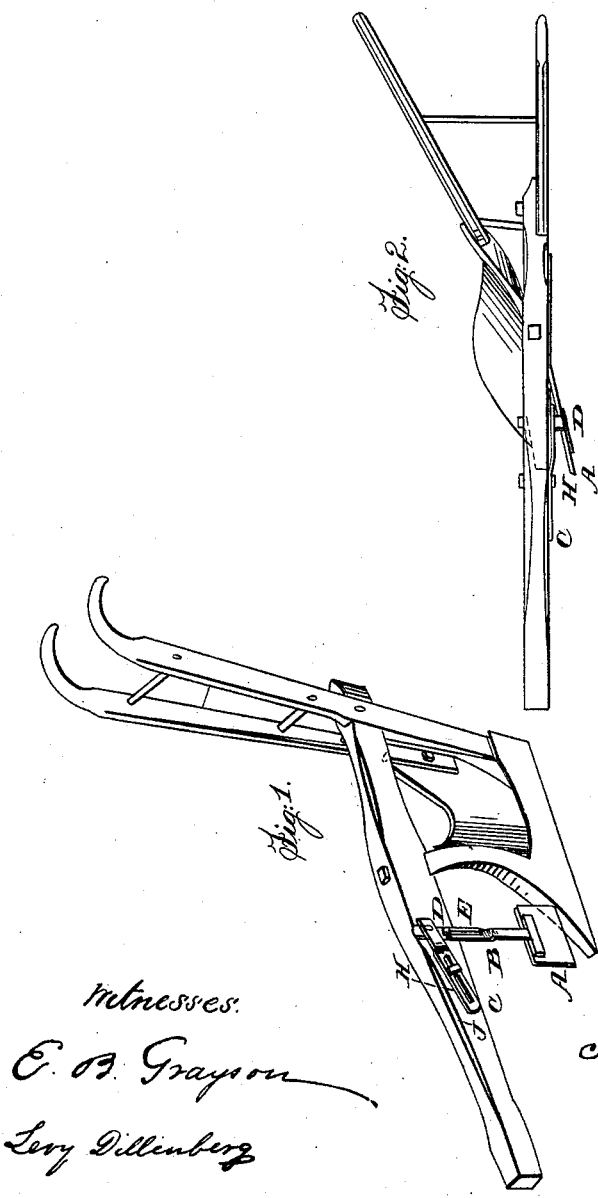

UNITED STATES PATENT OFFICE.

JOHN N. POND, OF WAKEFIELD, VIRGINIA, ASSIGNOR TO A. W. HOLT AND JOHN L. WHITE, OF SAME PLACE.

IMPROVEMENT IN PLOWS.

Specification forming part of Letters Patent No. 59,515, dated November 6, 1866.

*To all whom it may concern:*

Be it known that I, JOHN N. POND, of Wakefield, Sussex county, State of Virginia, have invented new and useful Improvements in Plows; and I do hereby declare the following to be an exact description of the same, reference being had to the accompanying drawings, and to the letters of reference marked thereon, making a part of this specification, in which—

Figure 1 is a perspective view of the plow; Fig. 2, a top view.

The nature of my invention consists in an oblong-shaped cutter in front of the plow, set obliquely with the plow, on regulating-levers, to adjust it higher or lower or back or forward. It is about five inches in depth and six or eight inches in length.

A represents the cutter, of an oblong square shape, with sharp edge in front and at the bottom, and intended to be attached to all turn-plows by adjustable levers B and C, for the purpose of regulating the distance of the cutter from the bottom of the plow, or forward or back, as may be necessary to operate the cutter an inch or more below the surface of the ground, or graze the top of the ground, as the operator may desire. This cleaner or cutter A stands obliquely in front of the plow, so as to throw off the dirt and weeds with the share side of the plow, the front end extending to the left, so as to go nearer to the crop than the plow and clean off the weeds and clods, so as to clear the crop and throw off the clods from the corn, and completely prevent the clods from falling upon the corn to break the stalks, which frequently occurs, to the injury of the corn, when but a few inches above the ground.

With this cutter the corn can be cleared of weeds and grass nearer to the roots of the corn than by the plow itself.

The vertical lever B is permanently fastened to the top side of the cutter A, and operates on a bolt, D, in the beam of the plow, and is adjusted higher or lower by the slot E, in which the bolt D plays. The top of lever B is pivoted to the hind end of lever C, and lever C is set on the beam longitudinally on a bolt, H, operating in a slot, J, for the purpose of adjusting the cutter back or forward whenever required, to regulate the distance of the cutter in front of the plow, and, when necessary, to throw the cutter with its front cutting-edge higher than the rear cutting-edge of the bottom, at the same time to work nearer to the corn than the plow could be operated, the cutter being located on the left side of the beam, or on the land-side of the plow nearest to the crop to be cleaned.

What I claim as my invention, and desire to secure by Letters Patent, is—

The rectangular cutter A, when arranged, combined, and operated by adjustable levers B and C, to be attached to any ordinary plow, as herein described, and for the purposes set forth.

JOHN N. POND.

Witnesses:
JOSEPH HARGRAVE,
CONNOLLY M. POND.